No. 843,427. PATENTED FEB. 5, 1907.
R. E. ATKINSON & T. A. TEATE.
POTATO SLICER.
APPLICATION FILED OCT. 30, 1905.
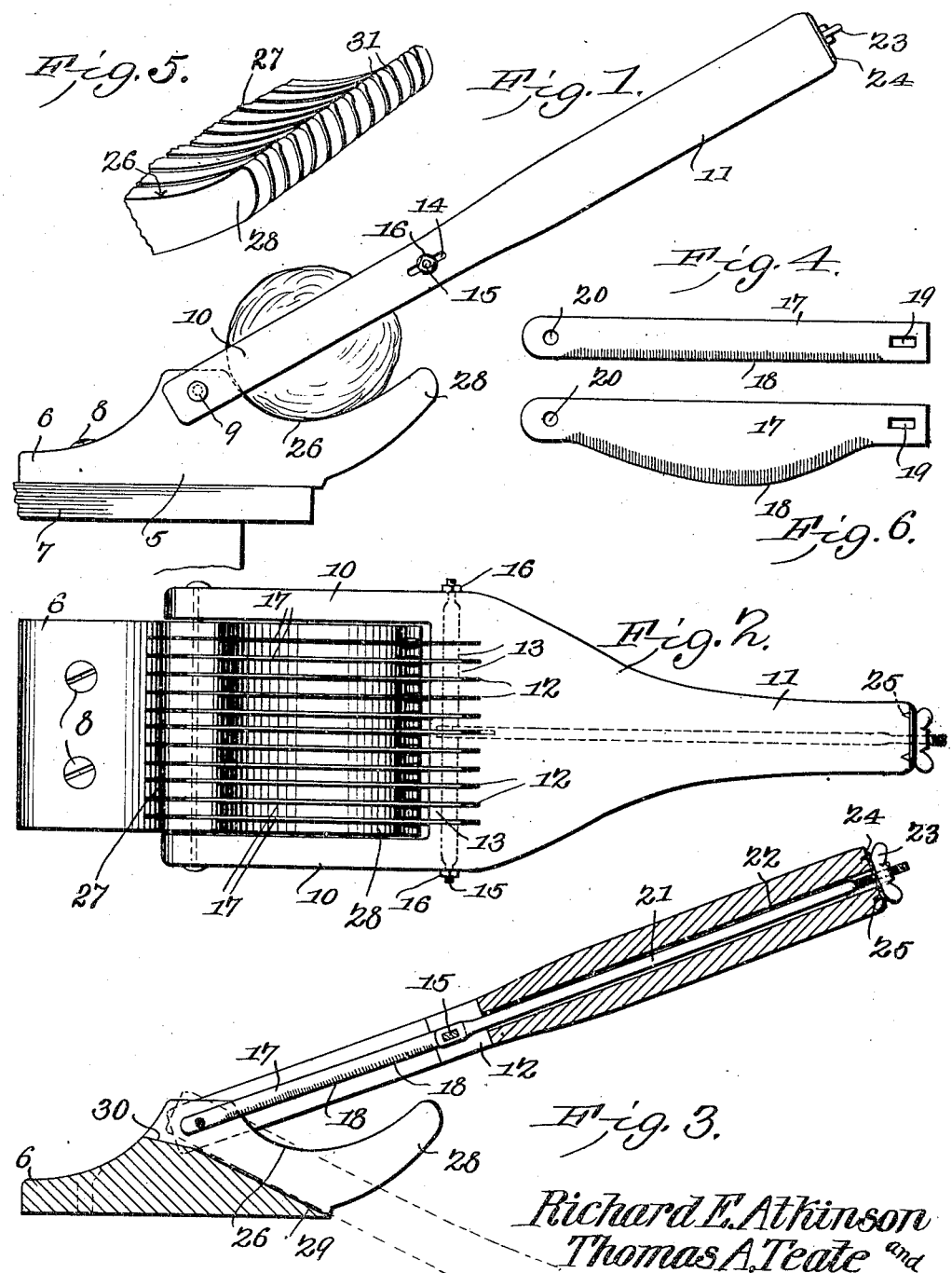
Richard E. Atkinson
Thomas A. Teate
Inventors
Witnesses
by
Attorneys

UNITED STATES PATENT OFFICE.

RICHARD E. ATKINSON, OF IAMONIA, FLORIDA, AND THOMAS A. TEATE, OF THOMASVILLE, GEORGIA, ASSIGNORS OF ONE-THIRD TO RALPH H. NEEL, OF THOMASVILLE, GEORGIA.

POTATO-SLICER.

No. 843,427.  Specification of Letters Patent.  Patented Feb. 5, 1907.

Application filed October 30, 1905. Serial No. 285,142.

*To all whom it may concern:*

Be it known that we, RICHARD E. ATKINSON and THOMAS A. TEATE, citizens of the United States, residing, respectively, at Iamonia and Thomasville, in the counties of Leon and Thomas and States of Florida and Georgia, have invented a new and useful Potato-Slicer, of which the following is a specification.

This invention relates to fruit and vegetable slicers, and has for an object to provide a simple, durable, and inexpensive device of this character by means of which potatoes or other vegetables may be conveniently cut into a plurality of slices at one operation of the machine.

A further object of the invention is to provide a supporting-base designed for attachment to a table or other support and having a concave seat formed therein for the reception of the vegetable to be cut, said base being provided with a series of parallel recesses, the lower walls of which serve to limit the downward movement of the knife-carrying frame.

A still further object is to mount the knife-carrying frame for swinging movement on the supporting-base, and, further, to provide means for regulating the tension of the flexible cutting knives or blades.

With these and other objects in view the invention consists in the construction and novel combination and arrangement of parts hereinafter fully described, illustrated in the accompanying drawings, and pointed out in the claims hereto appended.

In the accompanying drawings, forming a part of this specification, Figure 1 is a side elevation of a fruit and vegetable slicer constructed in accordance with our invention. Fig. 2 is a top plan view of the same. Fig. 3 is a transverse sectional view. Fig. 4 is a side elevation of one of the cutting knives or blades detached. Fig. 5 is a detail perspective view of a portion of the concave support. Fig. 6 is a side elevation of a modified form of blade.

Similar numerals of reference indicate corresponding parts in all the figures of the drawings.

The improved device consists of a supporting-base 5, the rear end of which is reduced at 6 for attachment to a table or other support 7, as by screws or similar fastening devices 8. Engaging the opposite ends of the base and mounted for swinging movement on a transverse pin or rod 9 are the spaced arms 10 of a knife-carrying frame, the latter having its free end terminating in an operating-handle 11.

The handle 11 is provided with a plurality of longitudinal slits or kerfs 12, defining spacing-blocks 13, and extending transversely of the handle and piercing said blocks is a recess 14, in which is mounted a laterally-movable knife-carrying bar 15, the opposite ends of which are threaded for engagement with nuts 16.

The bar 15 is preferably angular in cross-section, as shown, and mounted on said bar and seated in the slits or kerfs 12 are flexible parallel cutting knives or blades 17, the opposite ends of which are pivotally mounted on the transverse pin 9, so as to move with the knife-carrying frame when operating the machine.

The knives 17 are preferably formed of thin strips of metal, the lower edges of which are provided with cutting edges 18, while one end of each blade is provided with a rectangular opening 19 for the reception of the bar 15 and in its opposite end is a circular opening 20, adapted to receive the pin 9.

As a means for adjusting the tension of the blades or knives 17 a threaded rod 21 is attached to the central portion of the bar 15, with its free end extending through a longitudinal opening 22 in the operating-handle for engagement with a wing-nut 23, the latter bearing against a wear-plate 24, having spurs 25 for attachment to the end of the handle, as shown. It will thus be seen that by rotating the nut 23 the tension of the blade may be readily adjusted, while by removing the pin 9 and the bar 15 the knives may be quickly removed and sharpened or replaced by new blades when the same become worn or broken from constant use.

The forward portion of the supporting-base is provided with a concave seat or support 26, adapted to receive the potato or other vegetable to be sliced, and this support is formed with a plurality of spaced seating-recesses 27, corresponding in number to and adapted to receive the cutting-blades when the operating-handle is depressed to the position shown by dotted lines in Fig. 3 of the drawings.

The recesses 27 extend from the reduced extension 6 to the base of the upwardly-curved fingers 28 of the concaved supporting-seat, the lower walls of the recesses at the base of the fingers being inclined or beveled, as indicated at 29, to limit the downward movement of the operating-handle, while the lower walls of the recesses at the extension are also inclined, as shown at 30, to limit the rearward movement of said handle. The adjacent side edges of the fingers 28 at the free ends thereof are preferably beveled at 31 to assist in guiding the cutting-blades to the seating-recesses 27.

In operation the potato or other vegetable is placed on the concave support and the knives moved downwardly into engagement therewith by depressing the operating-handle, which causes the knives or blades to cut the potato into several slices.

In Fig. 6 of the drawings there is illustrated a modified form of the knife in which the cutting-blade is convex so as to strengthen the knife, this form of blade being particularly adapted for cutting or slicing certain kinds of vegetable.

If desired, the concave support instead of being arranged transversely of the base may be disposed in the same longitudinal plane therewith, in which case the vegetable will be sliced longitudinally instead of transversely.

Having thus described the invention, what is claimed is—

1. In a device of the class described, a base provided with a supporting-seat, a pin extending transversely of the base, a frame mounted for swinging movement on the pin and provided with a series of kerfs defining spacing-blocks, there being a transverse recess formed in the frame and piercing said spacing-blocks, a bar mounted for lateral movement in the recess, cutting-blades seated in the kerfs and carried by the bar and transverse pin, respectively, and a rod extending longitudinally of the frame and engaging the bar for adjusting the tension of the cutting-blades.

2. In a device of the class described, a base having one end thereof reduced and its opposite end provided with a concave supporting-seat having a series of spaced recesses formed therein, a frame having one end thereof bifurcated and mounted for swinging movement on the base and its opposite end provided with an operating-handle, a plurality of cutting-blades carried by the frame and adapted to engage the recesses in the supporting-seat, a rod extending longitudinally of the handle and having one end thereof operatively connected with the cutting-blades and its opposite end threaded and a nut engaging the threaded end of the rod and bearing against the handle for adjusting the tension of the cutting-blades.

In testimony that we claim the foregoing as our own we have hereto affixed our signatures in the presence of two witnesses.

RICHARD E. ATKINSON.
THOMAS A. TEATE.

Witnesses:
J. E. CRAIGMILES,
JOHN W. H. MITCHELL.